(12) United States Patent
Dong et al.

(10) Patent No.: US 10,932,161 B2
(45) Date of Patent: Feb. 23, 2021

(54) METHOD AND APPARATUS FOR RESELECTING A CELL IN AN IDLE MODE FOR PUBLIC SAFETY SERVICE

(71) Applicant: Samsung Electronics Co., Ltd., Suwon-si (KR)

(72) Inventors: Jeongsik Dong, Yongin-si (KR); Sung Hwan Won, Seoul (KR); Daejoong Kim, Yongin-si (KR); Junhyuk Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/761,695

(22) PCT Filed: Sep. 26, 2016

(86) PCT No.: PCT/KR2016/010791
§ 371 (c)(1),
(2) Date: Mar. 20, 2018

(87) PCT Pub. No.: WO2017/052347
PCT Pub. Date: Mar. 30, 2017

(65) Prior Publication Data
US 2018/0352480 A1    Dec. 6, 2018

(30) Foreign Application Priority Data
Sep. 25, 2015    (KR) .................. 10-2015-0136893

(51) Int. Cl.
*H04W 36/00*    (2009.01)
*H04W 76/36*    (2018.01)
(Continued)

(52) U.S. Cl.
CPC ......... *H04W 36/0007* (2018.08); *H04W 4/06* (2013.01); *H04W 4/90* (2018.02);
(Continued)

(58) Field of Classification Search
None
See application file for complete search history.

(56) References Cited

U.S. PATENT DOCUMENTS

2004/0202140 A1    10/2004    Kim et al.
2005/0090278 A1    4/2005    Jeong et al.
(Continued)

FOREIGN PATENT DOCUMENTS

CN    102202265 A    9/2011
CN    102685684 A    9/2012
(Continued)

OTHER PUBLICATIONS

"3rd Generation Partnership Project; Technical Specification Group Services and System Aspects; Study on enhancements to Multimedia Broadcast/Multicast Service (MBMS) for LTE (Release 13)", 3GPP Standard ; Technical Report ; 3GPP TR 23.741, 3rd Generation Partnership Project (3GPP), Mobile Competence Centre ; 650, Route Des Lucioles ; F-06921 Sophia-Antipolis Cedex ; France, vol. SA WG2, No. VI 3.0.0, Sep. 21, 2015 (Sep. 21, 2015), pp. 1-27, XP051294311.
(Continued)

*Primary Examiner* — Saba Tsegaye
(74) *Attorney, Agent, or Firm* — Jefferson IP Law, LLP

(57) ABSTRACT

The terminal supporting the public safety service based on the evolved multimedia broadcast multicast services (eMBMS) service needs to reselect a frequency providing the eMBMS service in the idle mode. The terminal may be configured to: receive a connection release message including priority information on frequencies for cell reselection; determine whether the terminal is in the idle mode; and perform, if the terminal is in the idle mode, cell reselection by selecting a cell to camp on based on the priority information. Here, the priority information may be configured so that the highest priority is assigned to the MBMS serving (Continued)

frequency used by the terminal to receive the MBMS service. In this way, the terminal supporting the public safety service may continuously receive the public safety service by selecting the current frequency during cell reselection.

6 Claims, 13 Drawing Sheets

(51) Int. Cl.
- *H04W 76/40* (2018.01)
- *H04W 4/06* (2009.01)
- *H04W 88/02* (2009.01)
- *H04W 4/90* (2018.01)

(52) U.S. Cl.
CPC ....... *H04W 36/0058* (2018.08); *H04W 76/36* (2018.02); *H04W 76/40* (2018.02); *H04W 88/02* (2013.01)

(56) References Cited

U.S. PATENT DOCUMENTS

| | | |
|---|---|---|
| 2005/0245260 A1 | 11/2005 | Nielsen et al. |
| 2006/0023664 A1 | 2/2006 | Jeong et al. |
| 2006/0079242 A1 | 4/2006 | Vaittinen et al. |
| 2008/0267109 A1 | 10/2008 | Wang et al. |
| 2011/0141908 A1 | 6/2011 | Ishida et al. |
| 2011/0222401 A1 | 9/2011 | Kyeong-In et al. |
| 2011/0305184 A1 | 12/2011 | Hsu |
| 2012/0195221 A1 | 8/2012 | Wang et al. |
| 2012/0213137 A1 | 8/2012 | Jeong et al. |
| 2012/0236776 A1* | 9/2012 | Zhang .................. H04W 48/12 370/312 |
| 2013/0077553 A1 | 3/2013 | Nielsen et al. |
| 2013/0107864 A1 | 5/2013 | Lee et al. |
| 2013/0142104 A1 | 6/2013 | Lee et al. |
| 2013/0229974 A1 | 9/2013 | Xu et al. |
| 2013/0294321 A1 | 11/2013 | Wang et al. |
| 2013/0308515 A1 | 11/2013 | Guo et al. |
| 2014/0010142 A1* | 1/2014 | Ranta-Aho ........ H04W 36/0061 370/312 |
| 2014/0044035 A1 | 2/2014 | Hwang et al. |
| 2014/0119265 A1 | 5/2014 | Shauh et al. |
| 2014/0153474 A1 | 6/2014 | Zhao et al. |
| 2014/0185455 A1 | 7/2014 | Balasubramanian et al. |
| 2014/0211685 A1 | 7/2014 | Kim et al. |
| 2014/0228030 A1 | 8/2014 | Jung et al. |
| 2014/0233452 A1 | 8/2014 | Kim et al. |
| 2014/0247717 A1 | 9/2014 | Jamadagni et al. |
| 2014/0293859 A1* | 10/2014 | Liang .................... H04W 36/28 370/312 |
| 2014/0355507 A1 | 12/2014 | Amerga et al. |
| 2015/0011216 A1 | 1/2015 | Jung et al. |
| 2015/0043418 A1 | 2/2015 | Jang et al. |
| 2015/0049662 A1 | 2/2015 | Kim et al. |
| 2015/0071157 A1 | 3/2015 | Jung et al. |
| 2015/0163706 A1 | 6/2015 | Wang |
| 2015/0195685 A1 | 7/2015 | Nielsen et al. |
| 2015/0223126 A1 | 8/2015 | Jung et al. |
| 2016/0021516 A1* | 1/2016 | Han ........................ H04W 4/06 370/312 |
| 2016/0249183 A1 | 8/2016 | Kim et al. |
| 2016/0249266 A1 | 8/2016 | Kim et al. |

FOREIGN PATENT DOCUMENTS

| | | |
|---|---|---|
| CN | 102740389 A | 10/2012 |
| CN | 103098386 A | 5/2013 |
| CN | 103581834 A | 2/2014 |
| KR | 10-2013-0036236 A | 4/2013 |
| KR | 10-2014-0046038 A | 4/2014 |
| KR | 10-2014-0077195 A | 6/2014 |
| KR | 10-2014-0114844 A | 9/2014 |
| WO | 2005-020474 A1 | 3/2005 |
| WO | 2008-134554 A2 | 11/2008 |
| WO | 2012-136023 A1 | 10/2012 |
| WO | 2012-137073 A2 | 10/2012 |
| WO | 2012134182 A2 | 10/2012 |
| WO | 2012-146284 A1 | 11/2012 |
| WO | 2012-155476 A1 | 11/2012 |
| WO | 2012-167661 A1 | 12/2012 |
| WO | 2013-023532 A1 | 2/2013 |
| WO | 2013-055099 A2 | 4/2013 |
| WO | 2013-131306 A1 | 9/2013 |
| WO | 2013-151360 A1 | 10/2013 |
| WO | 2013-170413 A1 | 11/2013 |
| WO | 2015-065053 A1 | 5/2015 |
| WO | 2015-060608 A1 | 8/2016 |

OTHER PUBLICATIONS

European Search Report dated May 28, 2018. Issued in European Application No. 16849072.0-1218/3337234, PCT/KR2016010791.

Chinese Office Action dated Jun. 19, 2020, issued in Chinese Application No. 201680055247.0.

\* cited by examiner

METHOD AND APPARATUS FOR RESELECTING A CELL IN AN IDLE MODE FOR PUBLIC SAFETY SERVICE

TECHNICAL FIELD

The present invention relates to a method and apparatus that support network access of a public safety LTE (PS-LTE) terminal providing a public safety service based on Long Term Evolution (LTE) Evolved Multimedia Broadcast Multicast Services (eMBMS) technology.

BACKGROUND ART

Cellular mobile communication networks have been developed primarily to provide point-to-point transmission services. With the development of broadband wireless transmission technology and terminals supporting various functions, there is a demand for various mobile communication services. In particular, Multimedia Broadcast Multicast Services (MBMS) is a technology that can provide a mobile broadcast service through a cellular mobile communication network. Recently, discussions have been made to provide LTE-based public safety services using evolved MBMS (eMBMS) technology (hereinafter, eMBMS and MBMS may be used interchangeably).

Unlike a point-to-point transmission service, the MBMS service is a point-to-multipoint transmission service that enables the base station to transmit the same packet to multiple terminals in one cell, thereby increasing the efficiency of utilization of radio resources. In addition, the LTE-based MBMS service employs a multi-cell transmission scheme enabling multiple base stations to simultaneously transmit the same packet. Using such a multi-cell transmission scheme, the terminal receiving the MBMS service may obtain a diversity gain at the physical layer, increasing the transmission efficiency.

DISCLOSURE OF INVENTION

Technical Problem

However, the eMBMS service is provided at a specific frequency. If a terminal is capable of accessing multiple frequency bands, it is necessary to change the frequency according to whether the terminal is a regular terminal or a terminal supporting the PS-LTE service.

Solution to Problem

In accordance with an aspect of the present invention, there is provided a method for a base station. The method may include: determining whether to terminate a call connection with a terminal; determining whether the terminal is a terminal receiving a multimedia broadcast multicast services (MBMS) service; and transmitting a connection release message including priority information on frequencies for cell reselection on the basis of the determination whether the terminal is a terminal receiving a MBMS service.

In accordance with another aspect of the present invention, there is provided a method for a terminal. The method may include: receiving a connection release message including priority information on frequencies for cell reselection; determining whether the terminal is in the idle mode; and performing, if the terminal is in the idle mode, cell reselection by selecting a cell to camp on based on the priority information, wherein the priority information is configured so that the highest priority is assigned to the MBMS serving frequency used by the terminal to receive a MBMS service. In addition, the current frequency of the terminal may be a frequency supporting the eMBMS service, and the terminal may support the public safety service based on the eMBMS service.

In accordance with another aspect of the present invention, there is provided a base station. The base station may include: a transceiver unit configured to transmit and receive a signal; and a controller configured to determine whether to terminate a call connection with a terminal, determine whether the terminal is a terminal receiving a multimedia broadcast multicast services (MBMS) service, and transmit a connection release message including priority information on frequencies for cell reselection on the basis of the determination whether the terminal is a terminal receiving a MBMS service.

In accordance with another aspect of the present invention, there is provided a terminal. The terminal may include: a transceiver unit configured to transmit and receive a signal to and from a base station; and a controller configured to control receiving a connection release message including priority information on frequencies for cell reselection, determining whether the terminal is in the idle mode, and performing, if the terminal is in the idle mode, cell reselection by selecting a cell to camp on based on the priority information, wherein the priority information is configured so that the highest priority is assigned to the MBMS serving frequency used by the terminal to receive a MBMS service. In addition, the current frequency of the terminal may be a frequency supporting the eMBMS service, and the terminal may support the public safety service based on the eMBMS service.

Advantageous Effects of Invention

In a feature of the present invention, the terminal supporting the PS-LTE service can continuously receive the public safety service by selecting the current frequency providing the eMBMS service during cell reselection.

MODE FOR THE INVENTION

Figure 1:
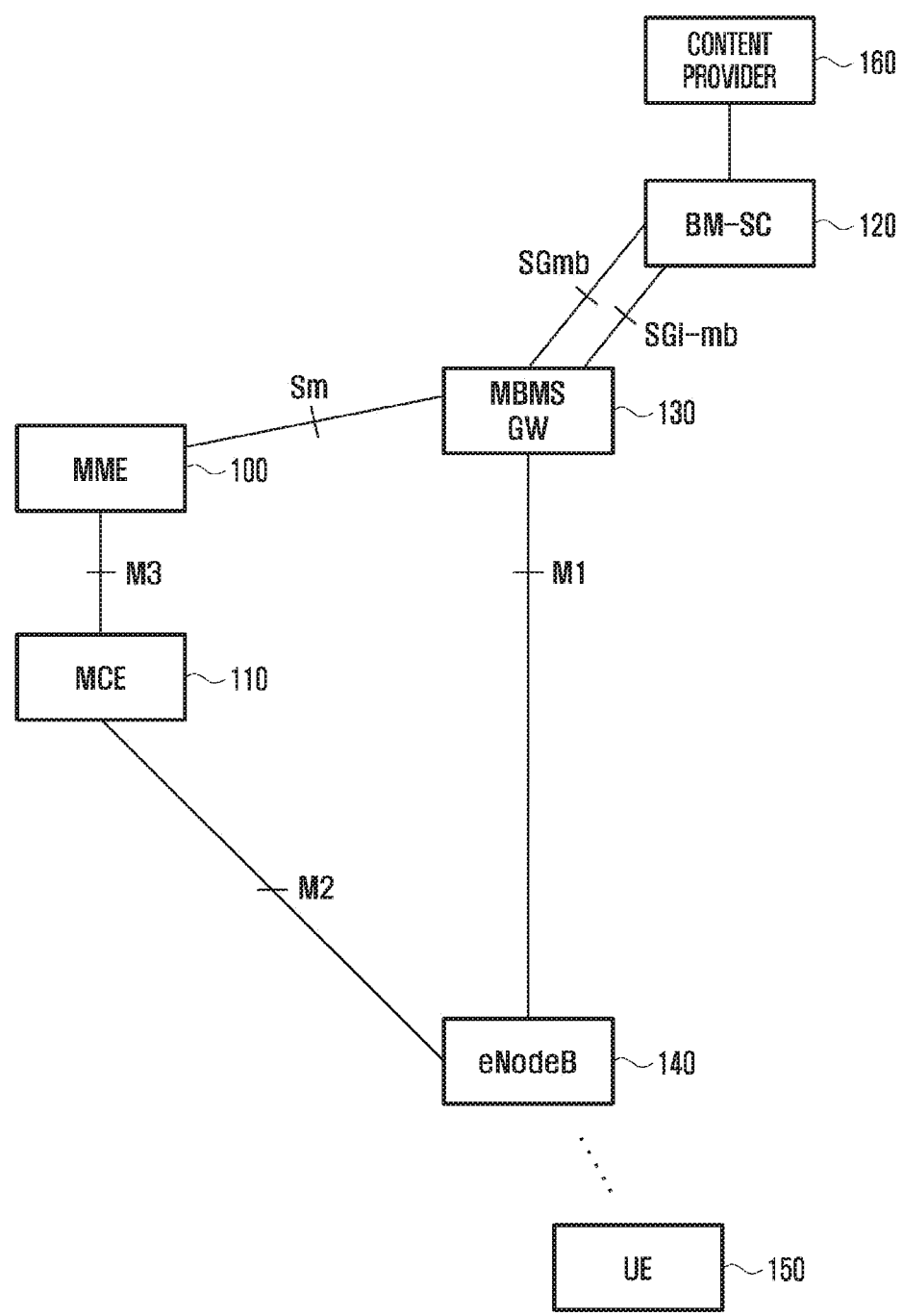
FIG. 1 illustrates the network architecture of the LTE system for the MBMS service.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should be construed in accordance with the spirit of the invention.

The following description of embodiments of the present invention is focused on OFDM-based wireless communication systems and the 3GPP E-UTRAN standards in particular. However, it should be understood by those skilled in the art that the subject matter of the present invention is applicable to other communication systems having similar technical backgrounds and channel configurations without significant modifications departing from the scope of the present invention.

The aspects, features and advantages of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

FIG. 1 illustrates the network architecture of the LTE system for the MBMS service.

In FIG. 1, the mobility management entity (MME) 100 is responsible for controlling the MBMS session, and is connected with the MBMS coordination entity (MCE) 110 through the M3 interface. The MCE 110 manages and allocates radio resources to base stations (enhanced Node B (eNB)) 140 belonging to the MCE, and performs admission control for the MBMS service. The MCE 110 determines the modulation and coding scheme (MCS) for the MBMS service and controls the MBMS session. For managing radio resources, the MCE is a logical node that may be physically separated from the base station, or may be distributed across multiple base stations so that one MCE instance on a base station becomes the master and MCE instances on the other base stations become slaves.

The broadcast/multicast service center (BM-SC) 120 performs authorization verification and service initiation for MBMS bearer services, and performs scheduling and transmission of MBMS content in consideration of the service quality. The BM-SC can autonomously deliver broadcasting content to the LTE network, and can also deliver broadcasting content in cooperation with an external content provider 160. The BM-SC is connected with the MBMS gateway (MBMS-GW) 130 through the SCmb interface for control message transmission and through the SGi-mb interface for content transmission (user traffic). The MBMS-GW 130 performs control (service start and stop) for the MBMS session and delivers content to the base station via IP multicast. The MBMS-GW is connected with the MME through the Sm interface for control message transmission and is connected with the base station through the M1 interface for content transmission.

The base station 140 allocates radio resources and performs synchronized transmission for MBMS services so as to receive information on the radio resources allocated by the MCE and deliver the broadcast service scheduled by the MCE to the terminal (user equipment (UE) or mobile terminal) 150. The base station is connected with the MCE via the M2 interface for control signal transmission. The terminal 150 receives synchronized MBMS data.

Figure 2:
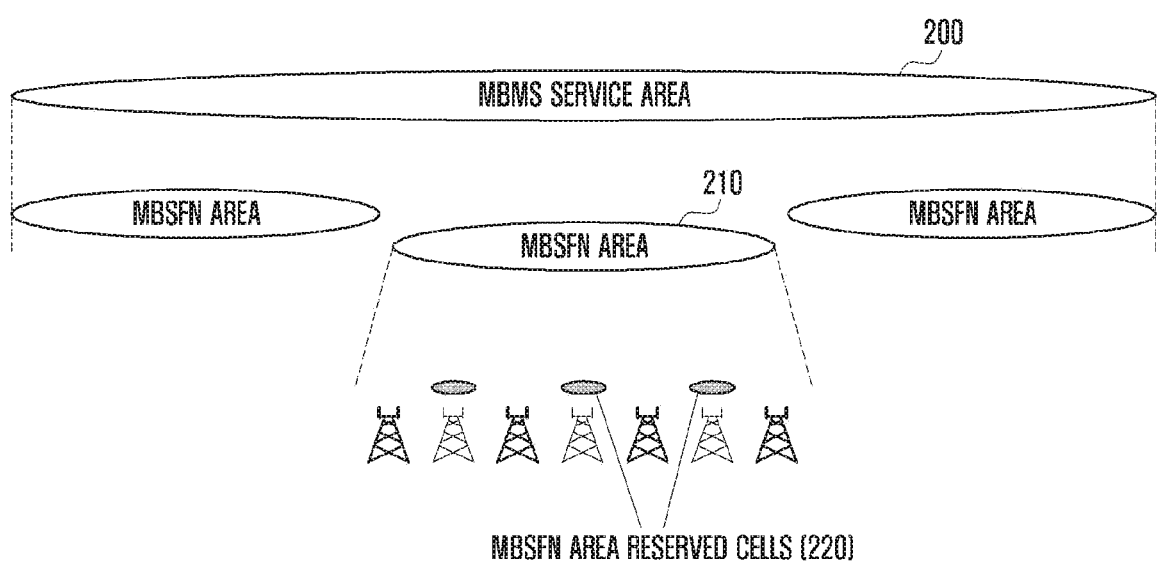
FIG. 2 illustrates an MBMS service area.

FIG. 2 illustrates an MBMS service area.

The MBMS service area 200 is a network area composed of plural base stations capable of performing signal transmission for the MBMS single frequency network (MBSFN) (referred to as MBSFN transmission).

The MBSFN area 210 (or broadcast area) is a network area composed of plural cells integrated for MBSFN transmission, and all MBSFN transmissions of the cells belonging to the MBSFN area are synchronized.

All cells except for MBSFN area reserved cells 220 may be used for MBSFN transmission. The MBSFN area reserved cell 220 is not used for MBSFN transmission, although it can transmit signals for other purposes, but only limited transmission power can be allowed for radio resources allocated to MBSFN transmission.

Figure 3:
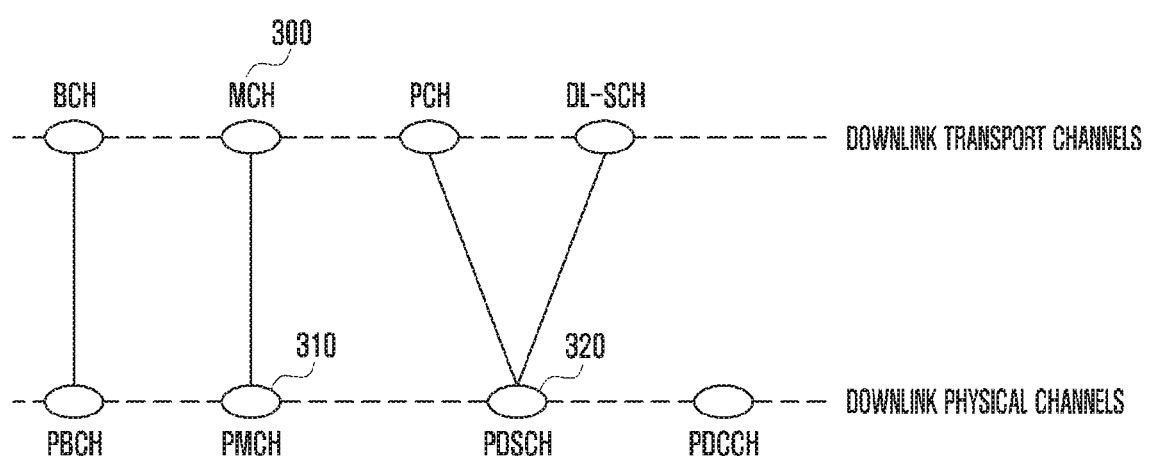
FIG. 3 illustrates a mapping relationship between downlink channels usable for MBSFN transmission.

FIG. 3 illustrates a mapping relationship between downlink channels usable for MBSFN transmission.

As shown in FIG. 3, the multicast channel (MCH) 300 is used as a downlink transport channel between the MAC layer and the physical layer, and the MCH is mapped to the physical multicast channel (PMCH) 310 serving as a downlink physical channel. On the other hand, unicast transmission where data is sent only to a specific terminal is generally performed using the physical downlink shared channel (PDSCH) 320.

The terminal in the idle mode performs the following measurement for cell reselection. The following rules apply to limit measurements of the terminal (refer to 3GPP TS 36.304 for more details).

If $S_{rxlev}$ (cell selection RX level value (dB) given by $Q_{rxlevmeas}-(Q_{rxlevmin}+Q_{rxlevminoffset})-P\text{compensation}-Q\text{offset}_{temp}$) is greater than $S_{IntraSearchP}$ and $S_{qual}$ (cell selection quality value (dB) given by $Q_{qualmeas}-(Q_{qualmin}+Q_{qualminoffset})-Q_{offsettemp}$) is greater than $S_{IntrasearchQ}$ in the serving cell, intra-frequency measurement may be not performed.

If the above condition is not satisfied, the terminal must perform intra-frequency measurement.

The terminal should perform measurement for E-UTRAN inter-frequencies and inter-RAT frequencies (frequencies of different radio access technologies), which are indicated by system information and for which the terminal has priority information, according to the following rule.

The terminal must perform measurement for the E-UTRAN inter-frequency or inter-RAT frequency having a higher priority than the current frequency.

If the serving cell satisfies Srxlev>$S_{nonIntraSearchP}$ and Squal>$S_{nonIntraSearchQ}$, the terminal may choose not to perform measurement for the E-UTRAN inter-frequency or inter-RAT frequency having a priority lower than or equal to that of the current frequency. Otherwise, the terminal must perform measurement for the E-UTRAN inter-frequency or inter-RAT frequency having a priority lower than or equal to that of the current frequency.

After performing measurement as described above, if threshServingLowQ is provided in SystemInformationBlockType3 and more than 1 second has elapsed since the terminal camped on the current serving cell, the terminal performs cell reselection by selecting the cell meeting the following rule.

If a EUTRAN or UTRAN FDD frequency with a higher priority fulfils Squal>$\text{Thresh}_{X, HighQ}$ for a time interval $T_{reselectionRAT}$, or if a UTRAN TDD, GERAN or CDMA2000 frequency with a higher priority fulfils Srxlev>$\text{Thresh}_{X, HighP}$ for a time interval $T_{reselectionRAT}$ Otherwise, if a frequency with a higher priority fulfils Srxlev>$\text{Thresh}_{X, HighP}$ for a time interval $T_{reselectionRAT}$ and more than 1 second has elapsed since the terminal camped on the current serving cell.

For E-UTRAN frequencies with the same priority, cell reselection is performed based on the ranking of reference signal received power (RSRP) values for the neighbor cells and serving cell.

For E-UTRAN frequencies or inter-RAT frequencies with a lower priority, the terminal performs cell reselection by selecting the cell meeting the following rule.

If the serving cell fulfils Squal<$\text{Thresh}_{Serving, LowQ}$ and a EUTRAN or UTRAN FDD frequency with a lower priority fulfils Squal>$\text{Thresh}_{X, LowQ}$ for a time interval $T_{reselectionRAT}$, or if the serving cell fulfils Squal<$\text{Thresh}_{Serving, LowQ}$ and a UTRAN TDD, GERAN or CDMA2000 frequency with a lower priority fulfils Srxlev>$\text{Thresh}_{X, LowP}$ for a time interval $T_{reselectionRAT}$ Otherwise, if the serving cell fulfils Srxlev<$\text{Thresh}_{Serving, LowP}$ and a frequency with a lower priority fulfils Srxlev>$\text{Thresh}_{X, LowP}$ for a time interval $T_{reselectionRAT}$ and more than 1 second has elapsed since the terminal camped on the current serving cell.

This reselection process is performed from higher-priority frequencies to lower-priority frequencies.

Figure 4:
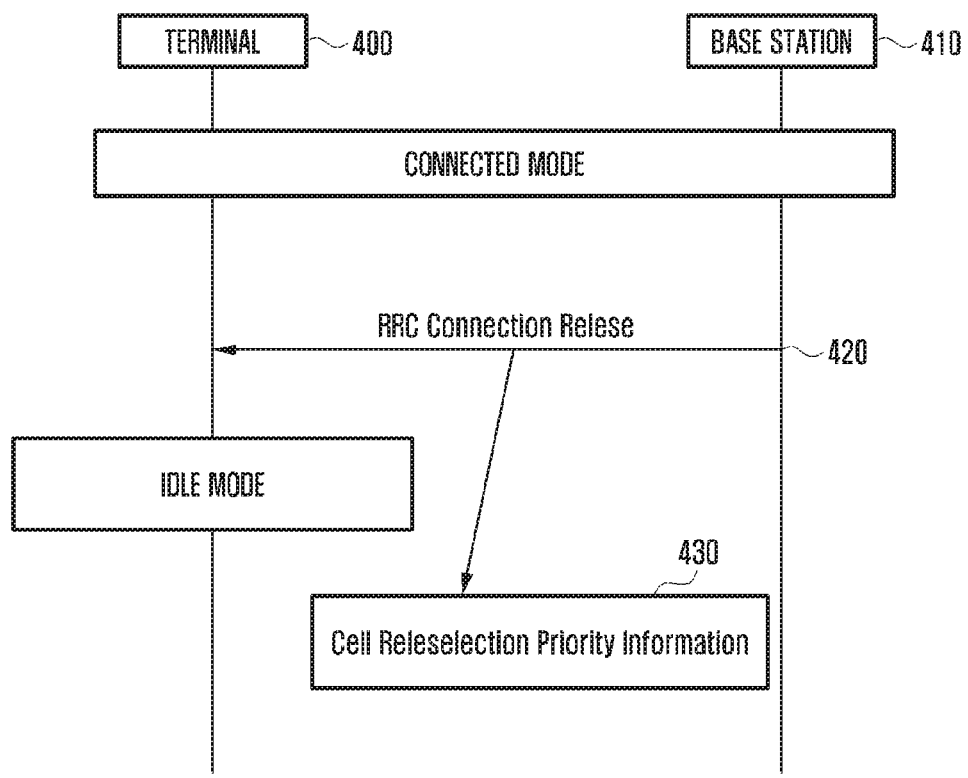
FIG. 4 illustrates a process for the base station to transmit priority information to the terminal.

FIG. 4 illustrates a process for the base station to transmit priority information to the terminal. Priority information of different E-UTRAN frequencies or inter-RAT frequencies is transmitted to the terminal through system information or an RRC connection release message (RRConnectionRelease message). In FIG. 4, the priority information is transmitted through an RRC connection release message.

After the base station 400 and the terminal 410 are in the connected mode for a while, the base station transmits an RRC connection release message 420 to the terminal. This RRC connection release message includes priority information for cell reselection (CellReselectionPriority 430). The priority information is absolute priority information on the carrier frequencies and is used for cell reselection. The priority information may have a value from 0 to 7 (the higher the number, the higher the priority). Upon reception of the RRC connection release message, the terminal makes a transition to the idle mode.

When the PS-LTE terminal using the eMBMS service makes a transition from the connected mode to the idle mode, if a frequency that does not provide the eMBMS service is selected during cell reselection, the PS-LTE terminal may be unable to receive the public safety service. Hence, in the present invention, there is a need for a method and apparatus that prevent the PS-LTE terminal from selecting another frequency. Here, the PS-LTE terminal may include a terminal currently receiving the public safety service from the network and a terminal capable of receiving the public safety service, and may be understood as including only a terminal currently receiving the public safety service from the network. In the following description, the terms "PS-LTE terminal" and "terminal" may be used interchangeably.

First, a description is given of a method for the network to distinguish a PS-LTE terminal from a regular terminal. The message of the following description may be transmitted and received between the base station and the terminal.

For example, the PS-LTE terminal may notify itself to the network by including a PS-LTE UE indication in the UE capability information at initial connection. In addition, upon receiving a UE capability enquiry message (UECapabilityEnquiry) from the base station, the terminal may send a response message containing a PS-LTE UE indication to the base station. Preferably, these schemes can be used to distinguish a PS-LTE terminal from a regular terminal. The UE capability information may be included in the UE context.

As another example, the PS-LTE terminal may transmit an eMBMS service request indication to the network when initiating the initial access or eMBMS service, and the MBMS entities of the network can identify the terminal receiving the public security service on the basis of the indication. Preferably, this scheme can be used to distinguish a terminal currently receiving the eMBMS-based PS-LTE service.

As another example, the network may separately transmit an eMBMS service reception enquiry message to terminals, and the terminal receiving the eMBMS-based public safety service may transmit a corresponding response message to the network. The network can distinguish the terminal receiving the public security service on the basis of the response message. The eMBMS counting request message and the eMBMS counting response message can be used respectively as the enquiry message and the response message. A new broadcast message can also be defined. Preferably, this scheme can be used to distinguish a terminal currently receiving the eMBMS-based PS-LTE service.

The network may distinguish the PS-LTE terminal according to the above schemes and may prevent the PS-LTE terminal from selecting a frequency not providing the eMBMS service during cell reselection according to the following schemes.

Figure 5:
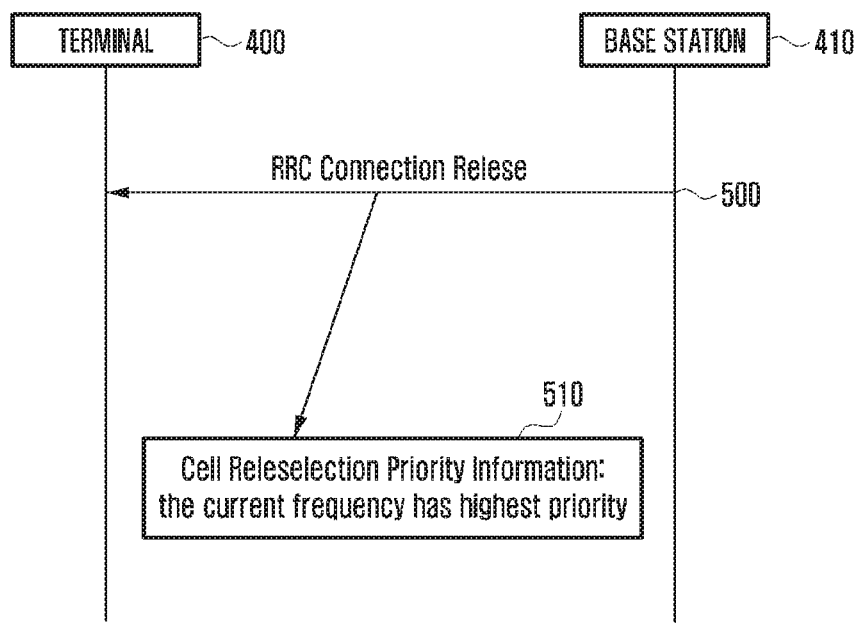
FIG. 5 shows a first example in which the terminal is prevented from selecting a different frequency.

FIG. 5 shows a first example in which the terminal is prevented from selecting a different frequency.

With reference to FIG. 5, the base station 410 may transmit the PS-LTE terminal 400 an RRC connection release message including priority information 510 that assigns the highest priority to the current frequency supporting the eMBMS service (500). Then, the terminal in the idle mode may select a cell to camp on based on the received priority information according to the cell reselection procedure described above. The possibility of reselecting the current frequency with the highest priority becomes higher when the priority information according to the present invention is applied.

Figure 6:
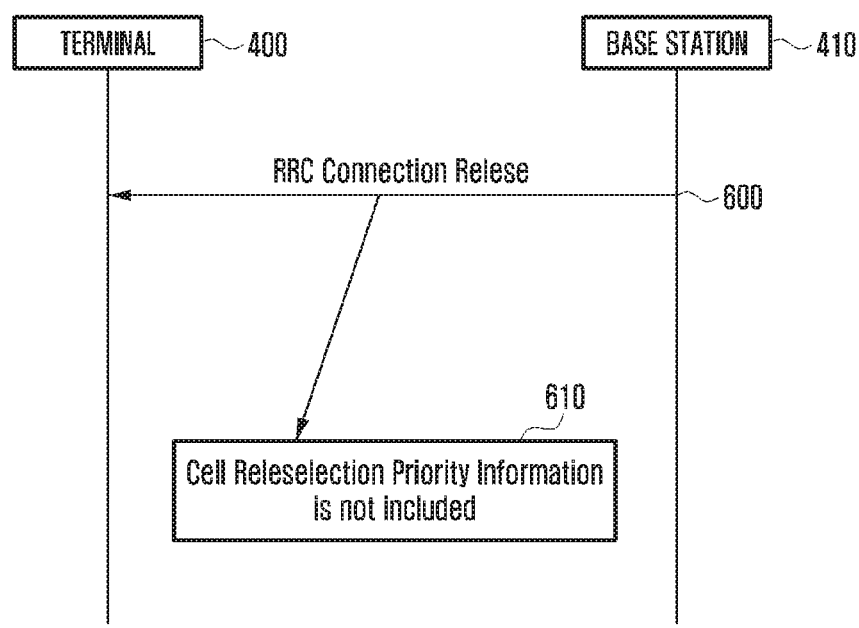
FIG. 6 shows a second example in which the terminal is prevented from selecting a different frequency.

FIG. 6 shows a second example in which the terminal is prevented from selecting a different frequency.

With reference to FIG. 6, the base station 410 may transmit the PS-LTE terminal 400 an RRC connection release message without priority information on frequencies (600). In this case, the PS-LTE terminal may be configured to select the current frequency or determine that the current frequency has the highest priority by ignoring priority information on the frequencies delivered through a means other than the RRC connection release message.

Figure 7:
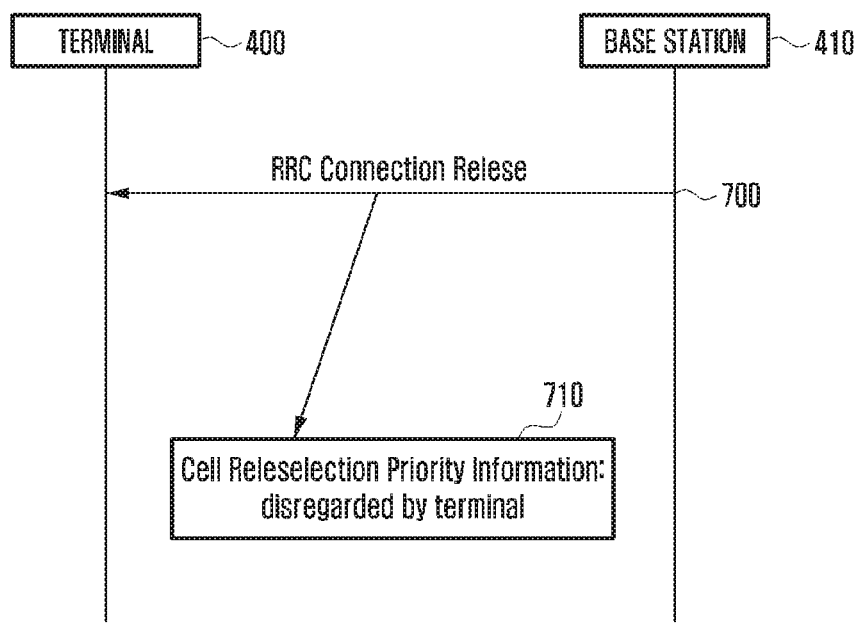
FIG. 7 shows a third example in which the terminal is prevented from selecting a different frequency.

FIG. 7 shows a third example in which the terminal is prevented from selecting a different frequency.

With reference to FIG. 7, the base station 410 may transmit the PS-LTE terminal 400 an RRC connection release message including priority information (700). However, the terminal may disregard the priority information. In this case, the PS-LTE terminal in the idle mode may be configured to select the current frequency or determine that the current frequency has the highest priority by ignoring the priority information.

Through the above schemes, when the PS-LTE terminal transitions from the connected mode to the idle mode, the PS-LTE terminal can be prevented from reselecting a frequency not supporting the eMBMS service so that it can receive the PS-LTE service.

Figure 8A:
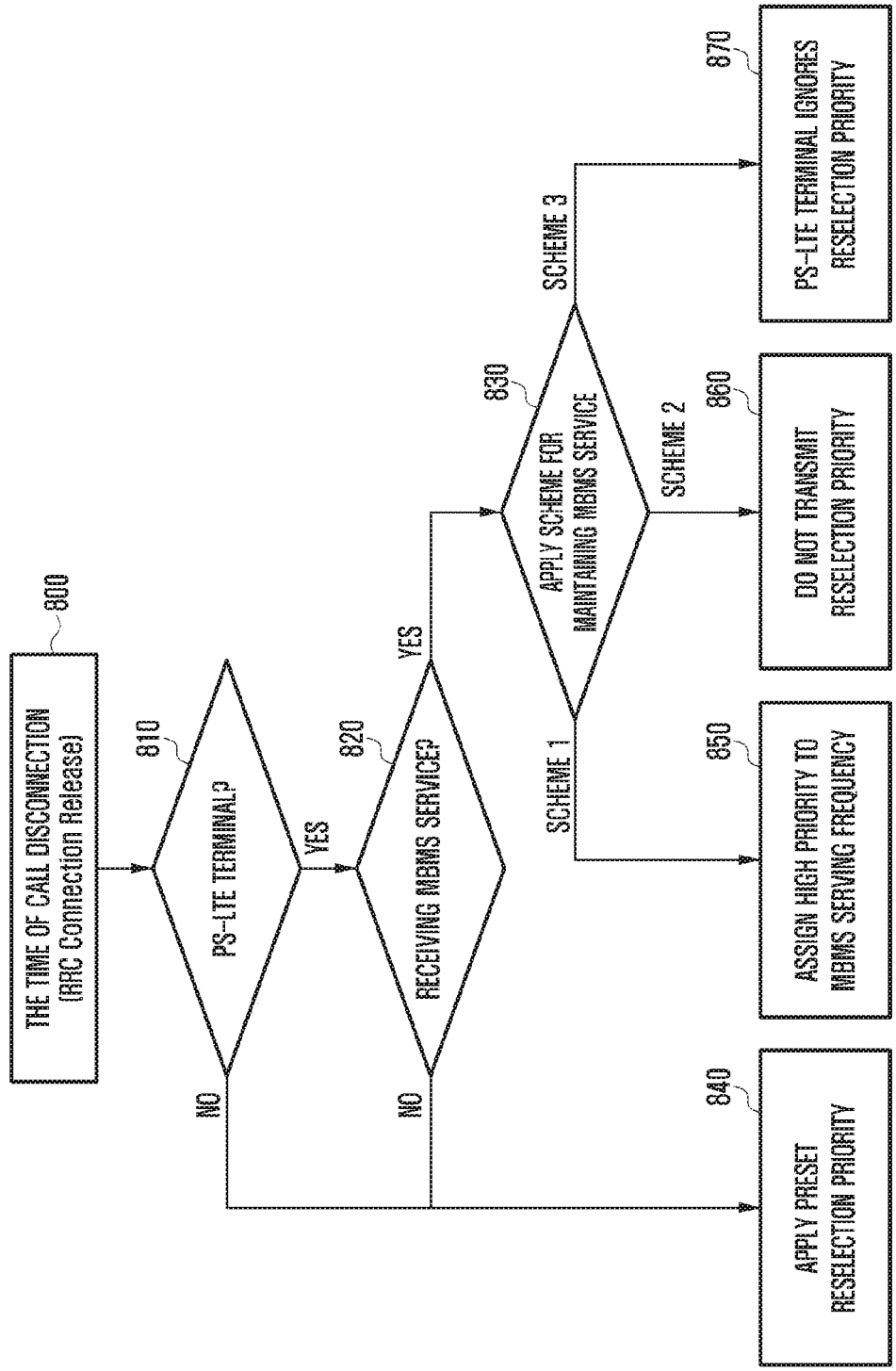
FIGS. 8A and 8B are flowcharts showing the logical flow of the present invention.

FIG. 8A is a flowchart showing the logical flow of the present invention.

With reference to FIG. 8A, at the time of call disconnection, the base station transmits an RRC connection release message to the terminal (800). The base station and the terminal determine whether the terminal is capable of receiving the PS-LTE service (810). Upon determining that the terminal is not capable of receiving the PS-LTE service, the terminal performs cell reselection using the existing reselection priority (840). Here, the RRC connection release message transmitted by the base station may include priority information on the frequencies. Upon determining that the terminal is capable of receiving the PS-LTE service, the terminal determines whether it is receiving the eMBMS service (820). If not receiving the eMBMS service, the terminal performs cell reselection using the existing reselection priority (840). If receiving the eMBMS service, the base station and the terminal applies the scheme for maintaining the eMBMS service (830). Here, the first scheme is to assign a high priority to the frequency providing the eMBMS service (850), the second scheme is to transmit an RRC connection release message without priority information on the frequencies (860), and the third scheme is to cause the PS-LTE terminal to disregard the priority information on the frequencies that may be included in the RRC connection release message (870).

Meanwhile, in the present invention, the PS-LTE terminal has been described as an example for ease of description, but the scope of the present invention is not limited to the PS-LTE terminal. That is, the present invention can be applied to all terminals using the eMBMS service.

Specifically, the base station may transmit the terminal receiving the eMBMS service an RRC connection release message including priority information that assigns the highest priority to the current frequency supporting the eMBMS service (first scheme). The base station may transmit the terminal receiving the eMBMS service an RRC connection release message not including priority information on frequencies (second scheme). Alternatively, although the base station transmits the terminal receiving the eMBMS service an RRC connection release message including priority information, the terminal may be configured to select the current frequency or determine that the current frequency has the highest priority by ignoring the priority information (third scheme).

This is described in detail with reference to FIG. 8B.

Figure 8B:
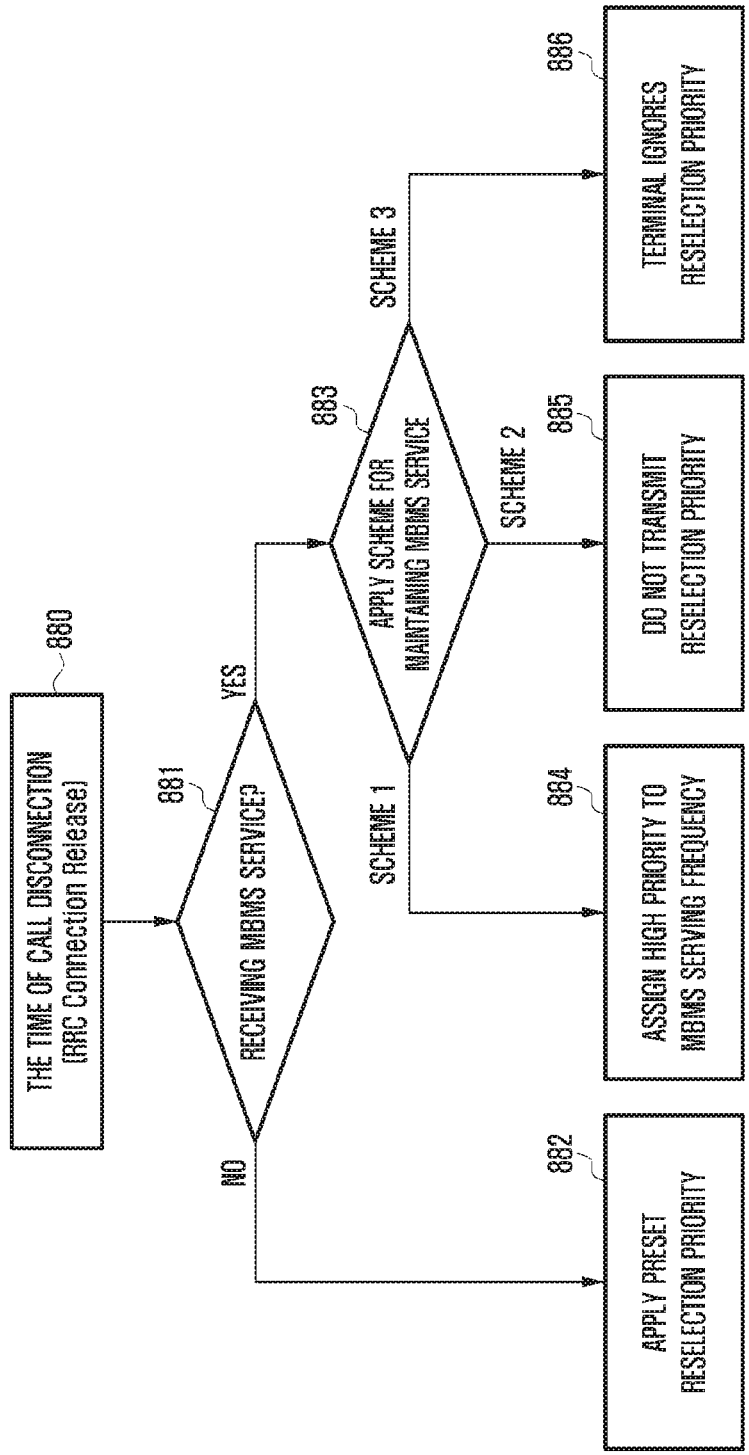

With reference to FIG. 8B, at step 880, the base station may determine the time of call disconnection. At the time of call disconnection, the base station may transmit an RRC connection release message to the terminal to release the call connection with the terminal. As described before, this RRC connection release message transmitted by the base station may include priority information for cell reselection. Here, the base station may determine the priority information according to whether the terminal is receiving the eMBMS service, and include the determined priority information in the RRC connection release message to be sent. This is described in more detail later.

At the time of call disconnection, at step 881, the base station may determine whether the terminal is receiving the eMBMS service.

Upon determining that the terminal is not receiving the eMBMS service, at step 882, the base station may apply the priority information for cell reselection according to the existing scheme. That is, the base station may determine the priority information for cell reselection according to the existing scheme, and transmit the RRC connection release message including the determined priority information to the terminal.

Upon determining that the terminal is receiving the eMBMS service, at step 883, the base station may apply the scheme for maintaining the eMBMS service. That is, when the terminal using the MBMS service reselects a cell of a frequency other than the frequency providing the MBMS service (MBMS frequency), it may fail to receive the MBMS service. Hence, the base station may apply the scheme for maintaining the MBMS service proposed in the present invention.

Specifically, at step 884, the base station may determine the priority information so that the highest priority is assigned to the serving frequency that is used by the terminal to receive the MBMS service (MBMS serving frequency). When the priority information is determined in this way, the terminal may continue to receive the MBMS service by selecting the cell of the MBMS frequency upon cell reselection (first scheme).

Or, at step 885, the base station may transmit an RRC connection release message without priority information. The terminal may select the MBMS serving frequency or determine that the MBMS serving frequency has the highest priority by ignoring priority information delivered through a means other than the RRC connection release message (second scheme).

Or, at step 886, the base station may transmit an RRC connection release message including priority information. The terminal may ignore the priority information included in the RRC connection release message, and select the MBMS serving frequency or determine that the MBMS serving frequency has the highest priority.

Here, the RRC connection release message may include priority information only or may include configuration information that directs the terminal to select the MBMS serving frequency or determine that the MBMS serving frequency has the highest priority by ignoring the priority information.

When the configuration information is not included in the RRC connection release message, according to its internal settings without separate settings, the terminal may ignore the priority information included in the RRC connection release message and select the MBMS serving frequency or determine that the MBMS serving frequency has the highest priority. Or, according to operator settings, the terminal may ignore the priority information included in the RRC connection release message and select the MBMS serving frequency or determine that the MBMS serving frequency has the highest priority. When the configuration information is included in the RRC connection release message, according to the settings of the base station, the terminal may ignore the priority information included in the RRC connection release message and select the MBMS serving frequency or determine that the MBMS serving frequency has the highest priority (third scheme).

The details are the same as those described above, and can be omitted below.

Accordingly, the terminal can select the frequency with the highest priority according to the priority information included in the received RRC connection release message. Hence, when the terminal is using the MBMS service, the base station may assign the highest priority to the MBMS serving frequency, and the terminal may select the MBMS frequency (first scheme).

Or, when the priority information is not included in the received RRC connection release message, the terminal may select the current MBMS serving frequency (second scheme).

Or, the terminal may ignore the priority information included in the RRC connection release message and select the MBMS serving frequency (third scheme).

Through the above schemes, the base station may prevent the terminal from selecting a frequency not supporting the MBMS service during cell reselection.

Figure 9:
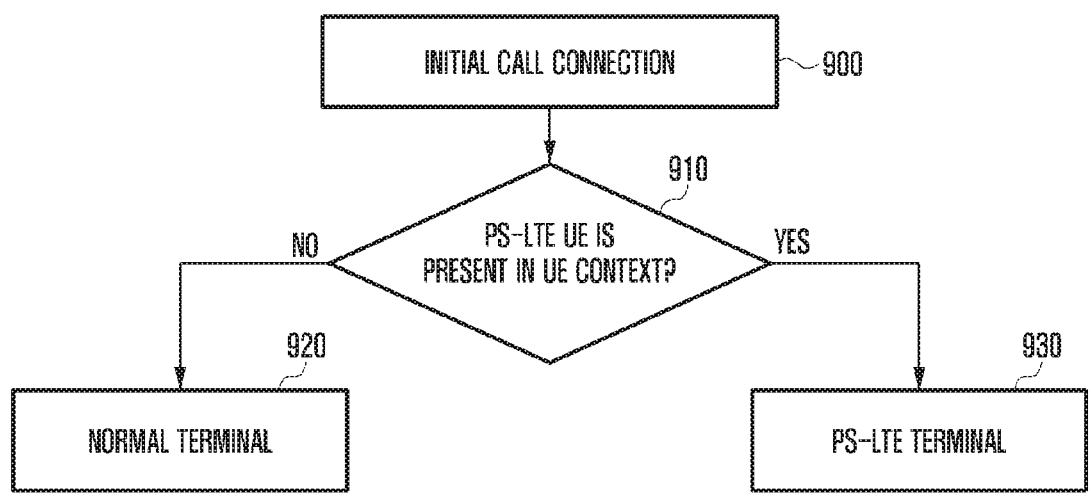
FIG. 9 shows an example of distinguishing a PS-LTE terminal.

FIG. 9 shows an example of distinguishing a PS-LTE terminal.

With reference to FIG. 9, at the time of initial connection (900), the network determines whether a PS-LTE UE indication of the terminal making a connection attempt is present in the UE context (910). Upon determining that a PS-LTE UE indication is not present, the network determines that the terminal making a connection attempt is a regular terminal (920). Upon determining that a PS-LTE UE indication is present, the network determines that the terminal making a connection attempt is a PS-LTE terminal (930).

Figure 10:
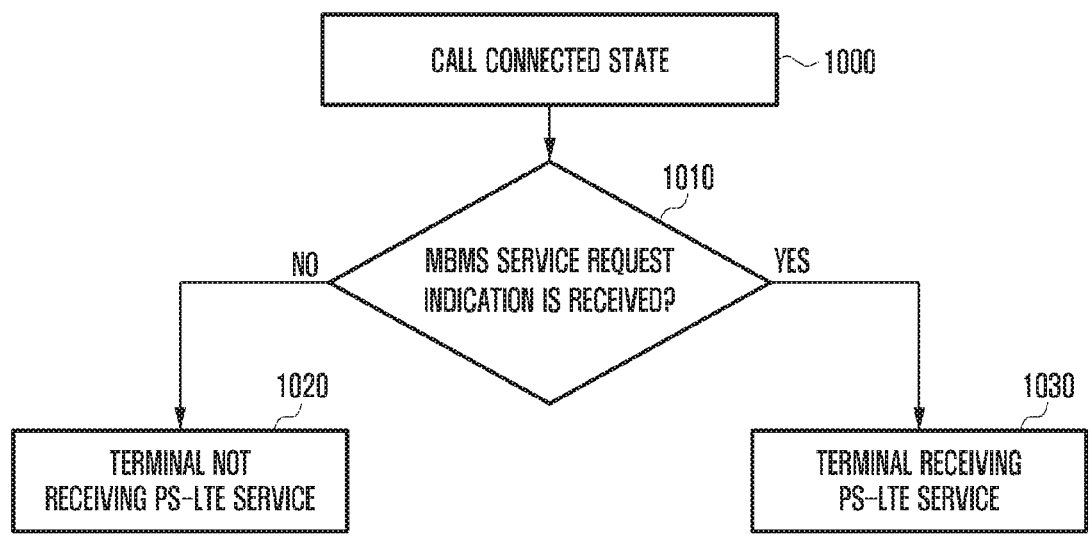
FIG. 10 shows another example of distinguishing a PS-LTE terminal.

FIG. 10 shows another example of distinguishing a PS-LTE terminal.

With reference to FIG. 10, at the time when the terminal is connected to the network (1000), the network determines whether an eMBMS service request indication is received from the terminal (1010). Upon determining that an eMBMS service request indication is not received, the network determines that the terminal is not receiving the PS-LTE service (1020). Upon determining that an eMBMS service request indication is received, the network determines that the terminal is receiving the PS-LTE service (1030).

Figure 11:
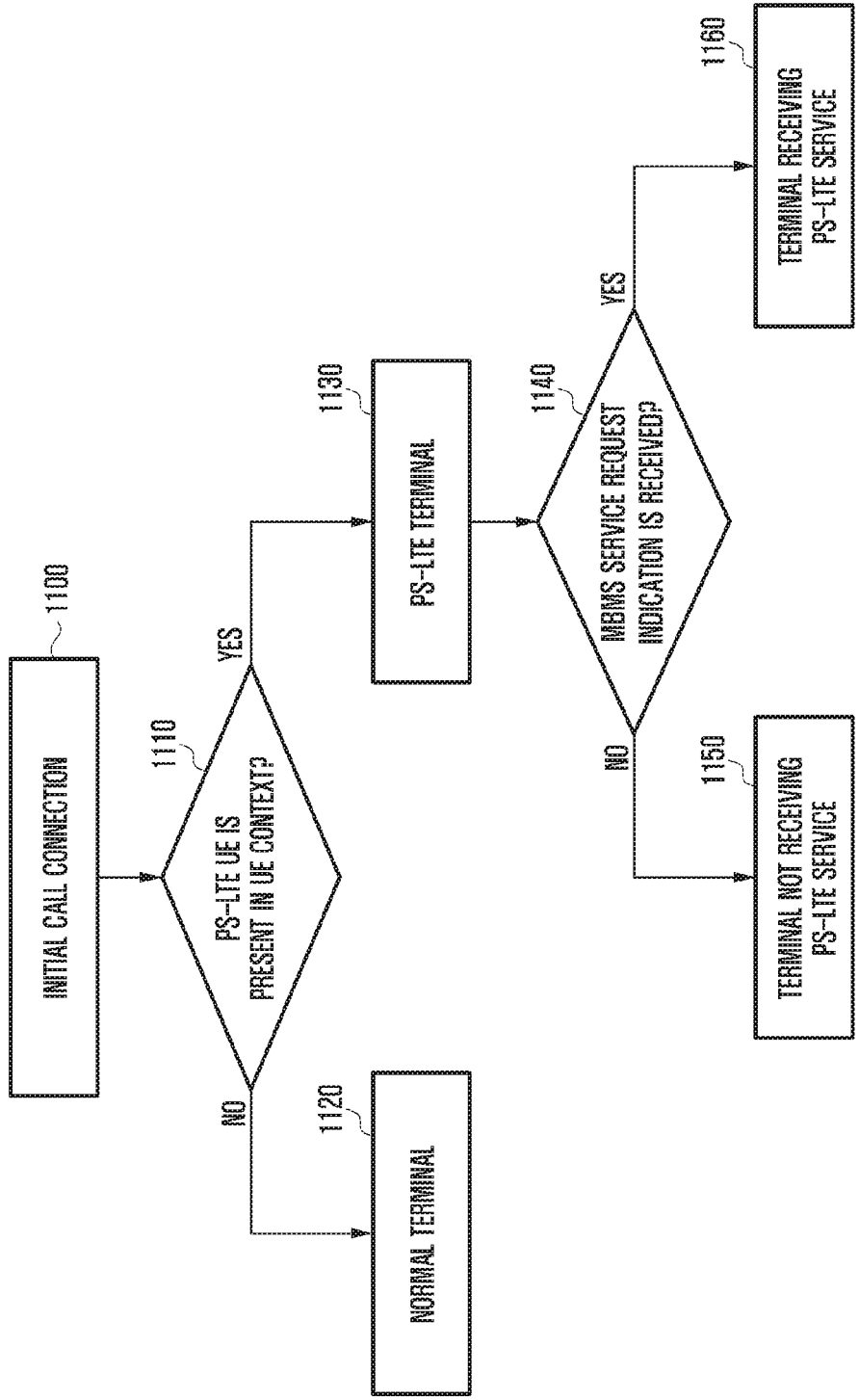
FIG. 11 illustrates an example of determining whether a PS-LTE terminal is receiving a PS-LTE service.

FIG. 11 illustrates an example of determining whether a PS-LTE terminal is receiving a PS-LTE service.

With reference to FIG. 11, at the time of initial connection (1100), the network determines whether a PS-LTE UE indication of the terminal making a connection attempt is present in the UE context (1110). Upon determining that a PS-LTE UE indication is not present, the network determines that the terminal making a connection attempt is a regular terminal (1120). Upon determining that a PS-LTE UE indication is present, the network determines that the terminal making a connection attempt is a PS-LTE terminal (1130). Thereafter, the network determines whether an eMBMS service request indication is received from the terminal (1140). Upon determining that an eMBMS service request indication is not received, the network determines that the terminal is not receiving the PS-LTE service (1150). Upon determining that an eMBMS service request indication is received, the network determines that the terminal is receiving the PS-LTE service (1160).

Figure 12:
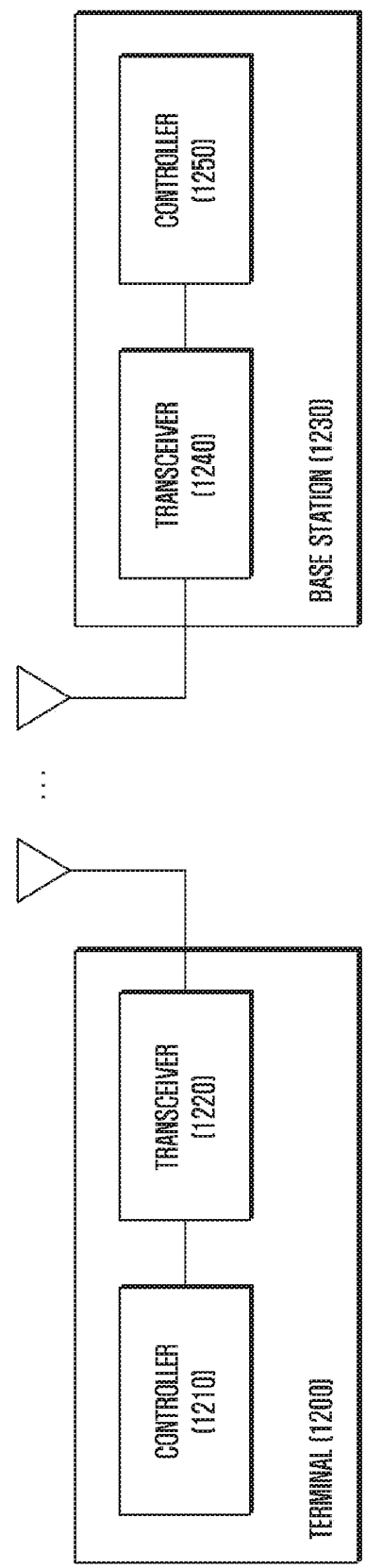
FIG. 12 is a block diagram of an apparatus that can carry out the method of the present invention.

FIG. 12 is a block diagram of an apparatus that can carry out the method of the present invention.

The terminal 1200 includes a controller 1210 and a transceiver unit 1220. The transceiver unit transmits and receives a signal to and from the base station. To enable the network to distinguish a PS-LTE terminal from a regular terminal, the controller may control the transceiver unit to: transmit UE capability information including a PS-LTE UE indication to the base station; transmit an eMBMS service request indication to the base station; or receive an eMBMS service reception enquiry message and transmit a corresponding response message to the base station. The controller may also control the transceiver unit to receive an RRC connection release message including priority information from the base station.

In addition, the controller checks whether the terminal is in the idle mode, and controls the cell reselection process based on the received priority information when the terminal is in the idle mode. Here, the current frequency of the terminal may have the highest priority. The controller may control the cell reselection process so that the current frequency is reselected or the current frequency is determined to have the highest priority with or without consideration of the priority information included in the RRC connection release message.

The base station 1230 includes a controller 1250 and a transceiver unit 1240. The transceiver unit transmits and receives a signal to and from the terminal. To enable the network to distinguish a PS-LTE terminal from a regular terminal, the controller may control the transceiver unit to: receive UE capability information including a PS-LTE UE indication from the terminal; receive an eMBMS service request indication from the terminal; or transmit an eMBMS service reception enquiry message and receive a corresponding response message from the terminal. The controller may also control the transceiver unit to transmit an RRC connection release message including priority information to the terminal.

The controller may generate priority information so that the current frequency of the terminal has the highest priority and transmit an RRC connection release message including the generated priority information to the terminal, or may transmit an RRC connection release message without priority information.

The invention claimed is:

1. A method for a terminal, the method comprising:
   receiving a public safety (PS) service through a frequency for a multimedia broadcast multicast services (MBMS);
   receiving a connection release message including priority information for a plurality of frequencies for cell reselection;
   determining whether the terminal is in the idle mode;
   performing, in case that the terminal is in the idle mode, cell reselection for maintaining the PS service, by selecting the frequency for the MBMS with disregarding the priority information; and
   receiving the PS service through the selected frequency.

2. The method of claim 1, wherein the terminal is a terminal supporting the PS service based on an evolved MBMS service.

3. The method of claim 1, further comprising transmitting terminal capability information of the terminal, and wherein the terminal capability information includes an indication to whether the terminal supports the PS service.

4. The method of claim 1, further comprising:
   receiving, from a base station, a first message to identify the terminal receiving the MBMS; and
   transmitting, to the base station, a second message including feedback information in response to the first message.

5. A terminal comprising:
   a transceiver configured to transmit and receive a signal to and from a base station; and
   a processor configured to control to:
      receive a public safety (PS) service through a frequency for a multimedia broadcast multicast services (MBMS),
      receive a connection release message including priority information for a plurality of frequencies for cell reselection,
      determine whether the terminal is in the idle mode,
      perform, in case that the terminal is in the idle mode, cell reselection for maintaining the PS service, by selecting the frequency for the MBMS with disregarding the priority information, and
      receive the PS service through the selected frequency.

6. The terminal of claim 5,
   wherein the processor is further configured to transmit terminal capability information of the terminal, and
   wherein the terminal capability information includes an indication to whether the terminal supports the PS service.

* * * * *